(12) United States Patent
Fujii et al.

(10) Patent No.: US 6,370,344 B1
(45) Date of Patent: Apr. 9, 2002

(54) IMAGE FORMING APPARATUS HAVING PRIORITY OF JOBS

(75) Inventors: Tetsuya Fujii; Koji Kakuda, both of Yokohama (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/511,112

(22) Filed: Feb. 23, 2000

(51) Int. Cl.$^7$ .............................................. G03G 15/00
(52) U.S. Cl. ............................ 399/75; 399/83; 358/300
(58) Field of Search ................................. 399/82, 83, 8, 399/81, 1; 358/1.1, 1.15, 1.16, 1.17, 300, 403, 296

(56) References Cited

U.S. PATENT DOCUMENTS

| | | | | |
|---|---|---|---|---|
| 5,669,040 A | * | 9/1997 | Hisatake ....................... | 399/83 |
| 5,774,356 A | * | 6/1998 | Hisatake et al. ......... | 364/148.01 |
| 6,026,258 A | * | 2/2000 | Fresk et al. ................... | 399/87 |
| 6,137,588 A | * | 10/2000 | Deen et al. ................. | 358/1.15 |

FOREIGN PATENT DOCUMENTS

| | | | |
|---|---|---|---|
| JP | 04-305777 | * | 10/1992 |
| JP | 08-163332 | * | 6/1996 |
| JP | 2000-20266 | * | 1/2000 |

* cited by examiner

*Primary Examiner*—Robert Beatty
(74) *Attorney, Agent, or Firm*—Foley & Lardner

(57) ABSTRACT

When a user stands in front of an image forming apparatus, sets originals on an ADF, and depresses a start key, a central control unit effects issuance of a print job, which is to be executed subsequent to a scanner job, on a print control order management table. Then, if print data is sent from a client to the image forming apparatus via an external controller, the central control unit issues as a second print job the print request from the client because the first print job was issued on the print control order management table. The central control unit does not operate a printer unit until the original reading operation by the ADF is finished. The moment the original reading operation by the ADF is finished, the central control unit executes printing by the printer unit on the basis of the read original data. After completing printing of all original data read by the ADF, the central control unit starts the print job sent from the client.

2 Claims, 3 Drawing Sheets

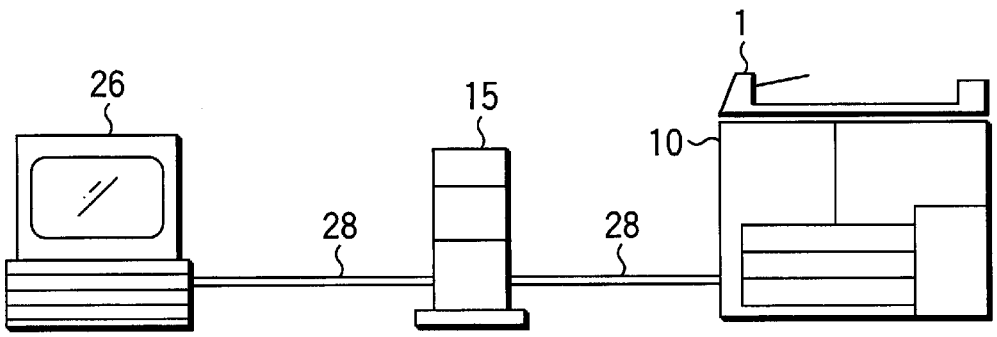
FIG. 4
| 21a → | 1 | ORIGINAL DATA READ FROM ADF |
| | 2 | PRINT REQUEST SENT FROM PC |
| | 3 | · · · · · |
FIG. 5
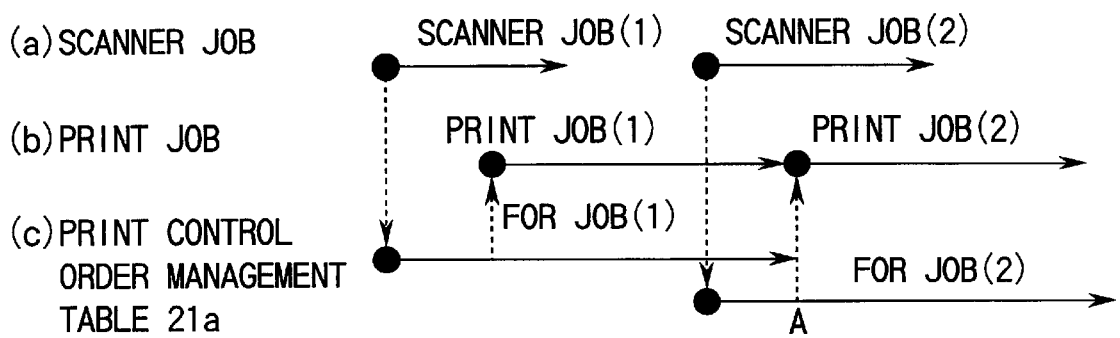
FIG. 6

IMAGE FORMING APPARATUS HAVING PRIORITY OF JOBS

BACKGROUND OF THE INVENTION

The present invention relates to an image forming apparatus capable of reading an original and forming an image, wherein a scanner unit and a printer unit are provided independently from each other and can be operated independently and in parallel at the same time.

There is known a conventional image forming apparatus, such as a digital composite machine, wherein a scanner unit and a printer unit are provided independently from each other and can be operated independently and in parallel at the same time, and thus a scanner job and a print job are performed independently. In this type of image forming apparatus, in a case where a scanner job and a print job are executed as a pair, issuance of a table storing a print control order of jobs in the printer unit (hereinafter referred to as "issuance of a print job") is made after the end of the scanner job.

If the issuance of the print job is made after the end of the scanner job, however, the following problems will arise.

Problem 1. Assume that 50 originals are set on an automatic document feeder (ADF) and a start key is depressed. Then assume that while the scanner unit in the image forming apparatus is reading the tenth original, a print job has been transmitted via a communication network from a personal computer to the image forming apparatus which is in the document input operation.

In this case, since the scanner job is not finished, the issuance of the print job has not yet been made. A control unit in the image forming apparatus thus determines that there is no job which occupies the printer unit, and first executes the print job transmitted from the personal computer and starts printing.

In such a case, from the standpoint of the user who is inputting originals through the ADF in front of the image forming apparatus, a print result of the job transmitted from the personal computer is first printed although images of the originals which are being read and input through the ADF by the user himself should first be printed. Because of this, the user have a sense of unexpectedness, wondering why an unknown printed matter has been output.

Problem 2. Assume that in an image forming apparatus capable of independently operating a scanner unit and a printer unit, pairs of jobs of operations in the scanner unit and printer unit have been set in succession. In these set operations, such a case may occur that the job in the printer unit is finished while the scanner job is not. In this case, since the scanner job is not finished despite the printer unit not being used, the print job cannot be started and the efficiency of operations will lower. As a result, a long time is needed to complete all jobs in succession.

BRIEF SUMMARY OF THE INVENTION

The object of the present invention is to provide an image forming apparatus capable of independently operating a scanner unit and a printer unit, wherein no sense of unexpectedness is caused to the user because of the operations of the scanner unit and printer unit in reading of originals and printing, and the scanner unit and printer unit can be operated with high efficiency and the time for completion of operations is decreased.

In order to achieve the object of the invention, there is provided an image forming apparatus connected to a personal computer, etc. via a communication line, comprising: feed means for successively feeding originals; read means for optically scanning the originals fed by the feed means and reading images; reception means for receiving image data transmitted from the personal computer, etc.; memory means for storing image data read by the read means or the image data received by the reception means; image forming means for forming images of the image data stored in the memory means; setting means for setting a series of operations in which images of the originals are read by the read means and images are formed by the image forming means; and control means for executing a control to stop an image forming operation for image data received by the reception means, until the series of operations, if set by the setting means, are finished.

According to this invention, there is also provided an image forming apparatus comprising: feed means for successively feeding originals; read means for optically scanning the originals fed by the feed means and reading images; memory means for storing image data read by the read means; image forming means for forming images of the image data stored in the memory means; setting means for setting a series of operations in which images of the originals are read by the read means and images are formed by the image forming means; and control means for controlling the series of operations set by the setting means, wherein when an original read operation by the read means is finished, the control means controls a subsequently set original read operation by the read means, and when an image forming operation by the image forming means is finished, the control means controls a subsequently set image forming operation by the image forming means.

BRIEF DESCRIPTION OF THE SEVERAL VIEWS OF THE DRAWING

FIG. 4 shows an example of an image forming apparatus connected to an external apparatus;

FIG. 5 shows an example of a structure of a print control order management table according to a first embodiment; and FIG. 6 is a timing chart for describing an operation of a second embodiment.

DETAILED DESCRIPTION OF THE INVENTION

An embodiment of the present invention will now be described with reference to the accompanying drawings.

Figure 1:
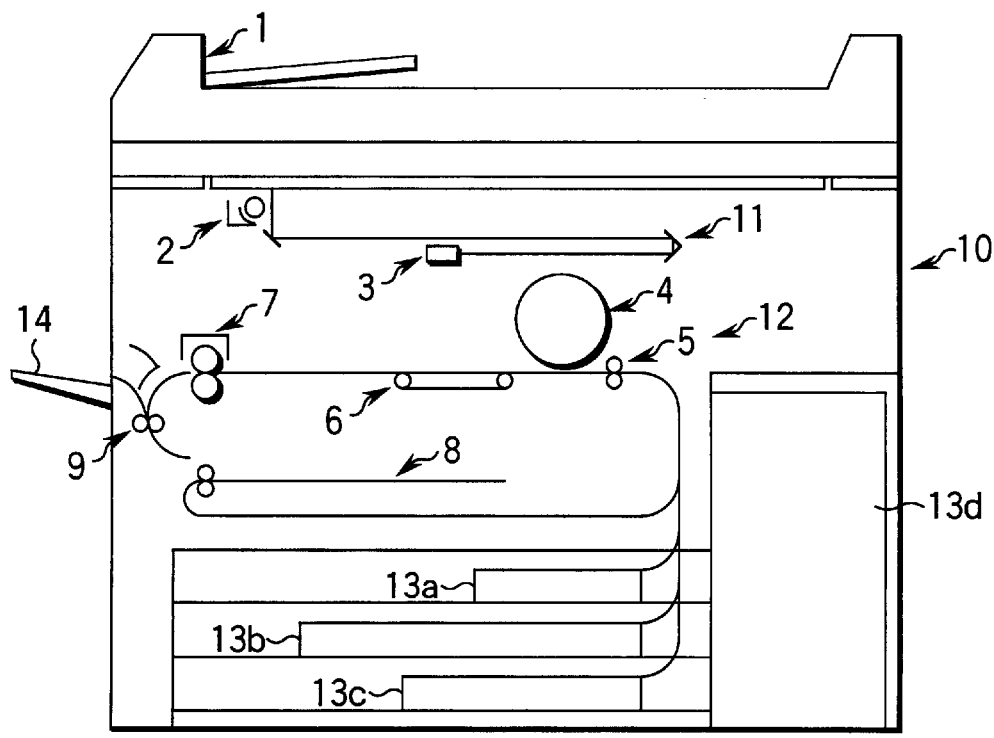
FIG. 1 is a cross-sectional view showing a schematic cross-sectional structure of an image forming apparatus according to the present invention.

FIG. 1 shows a schematic cross-sectional structure of an image forming apparatus according to the present invention. Specifically, this image forming apparatus 10 comprises a scanner 11 and a printer 12, and an automatic document feeder (ADF) 1 is mounted on an upper part thereof.

The scanner unit 11 serving as reading means includes a read light source (lamp) 2 as a light source, and a CCD sensor 3 for receiving reflection light from an original. The scanner unit 11 comprises a driving system (not shown) for varying positions of the respective elements including the light source 2.

In the printer unit 12 serving as image forming means, for example, a laser optical system is combined with an electrophotographic system capable of forming an image on transfer paper. Specifically, the printer 12 has a photosensitive drum 4 functioning as an image carrying body rotatably supported at a substantially central region within the apparatus. The printer 12 comprises register rollers 5, a transfer belt 6, a fixing device 7, an automatic double-side unit (ADU) 8, a reversing unit 9, etc.

Sheet feed cassettes 13a, 13b, 13c serving as sheet feed means are vertically stacked so as to be removable from a front side of the image forming apparatus 10. Copying paper sheets are stored in the sheet feed cassettes 13a, 13b, 13c. The copying paper sheets stored in the sheet feed cassettes 13a, 13b, 13c are picked up from an uppermost one by pickup rollers (not shown) and taken out.

A large-capacity sheet feeder (LCF) 13d is provided on a right side of the image forming apparatus 10. Copying paper sheets stored in the large-capacity sheet feeder 13d are picked up and taken out from an uppermost one by pickup rollers (not shown). A copying paper sheet fed to a take-out end side of the largecapacity sheet feeder 13d is conveyed toward the printer 12.

A finisher (FINISHER) 14 for discharging a paper sheet on which an image has been formed in the printer unit 12 is provided on a left side of the image forming apparatus 10.

Figure 2:
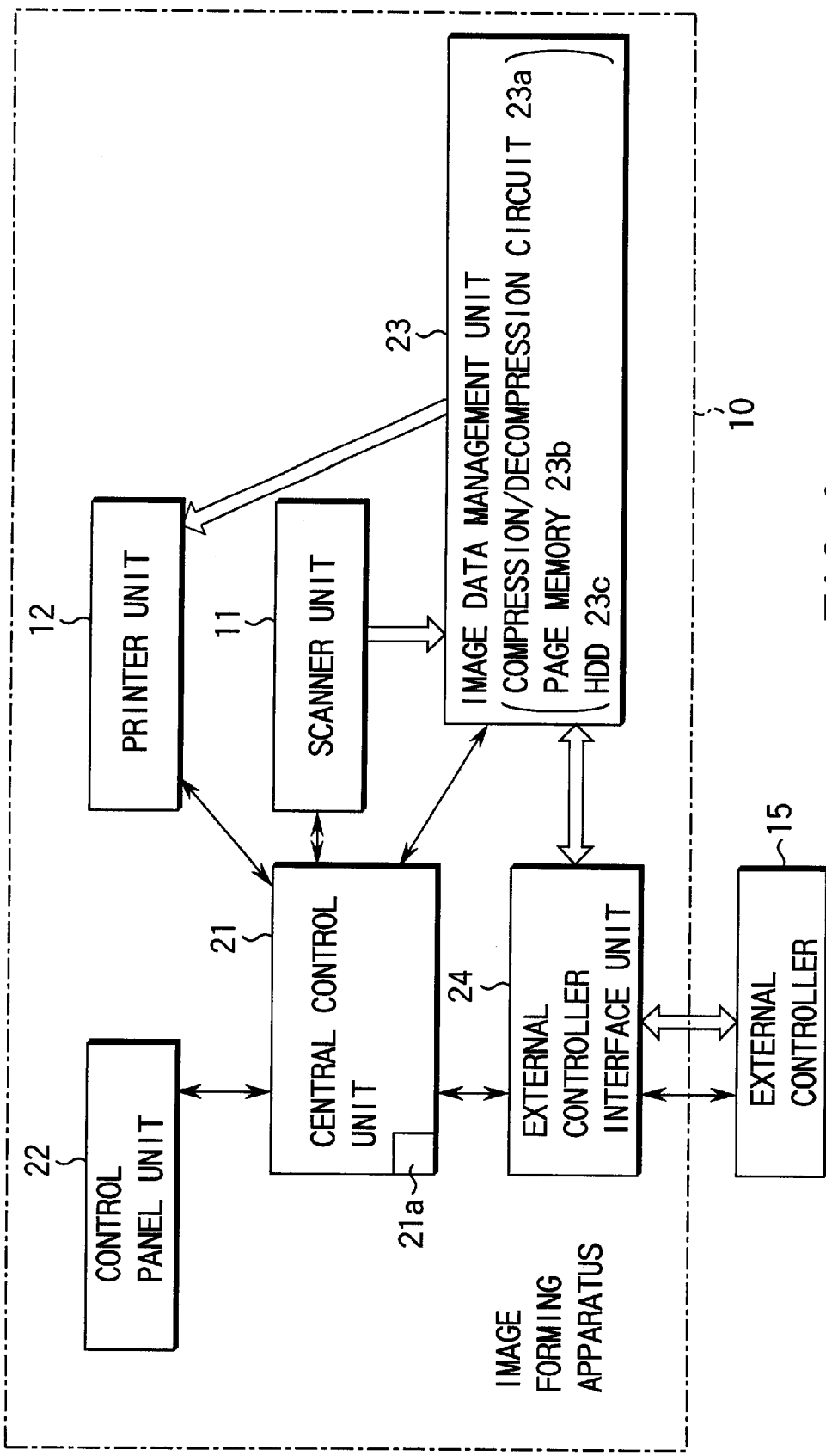
FIG. 2 shows a schematic structure of the image forming apparatus according to the invention.

FIG. 2 shows a schematic structure of the image forming apparatus according to the present invention. The image forming apparatus 10 comprises a central control unit 21 for controlling the entirety of the apparatus, a control panel unit 22 serving as an input/output interface with a user, the printer unit 12 for effecting printing on paper sheets, the scanner unit 11 for reading originals, an image data management unit 23 having memory means for compressing/decompressing and storing image data, and an external controller interface unit 24 for communication with the external controller 15.

The central control unit 21 is provided with a print control order management table 21a for managing a print control order, as will be described later in detail.

The image data management unit 23 includes a compression/decompression circuit 23a for compressing/decompressing image data, a page memory 23b for storing image data in units of a page, and a hard disk drive (HDD) 23c for storing image data.

In the image forming apparatus 10 the central control unit 21, control panel unit 22, image data management unit 23, external controller interface unit 24, scanner unit 11 and printer unit 12 are connected via control interfaces. The control interfaces are indicated by single-line arrows in the figure. The central control unit 21 controls and synchronizes the scanner unit 11, printer unit 12, control panel unit 22, image data management unit 23, and external controller interface unit 24. Thus, the respective functions of the image forming apparatus 10 are realized.

The scanner unit 11, printer unit 12, central control unit 21, image data management unit 23, and external controller interface unit 24 are connected via image data interfaces. The image data interfaces are indicated by white-line arrows in the figure. Image data is transmitted among the image data management unit 23, scanner unit 11, printer unit 12, external controller interface unit 24, with the image data management unit 23 functioning as a hub.

The image forming apparatus 10 is connected to the external controller 15 via the external controller interface unit 24 so that the image forming apparatus 10 can receive and transmit image data from and to the external controller 15.

The external controller 15 can read data on the state of the image forming apparatus 10 via the external controller interface unit 24 and can control the central control unit 21 and control panel unit 22 via the external controller interface unit 24.

Figure 3:
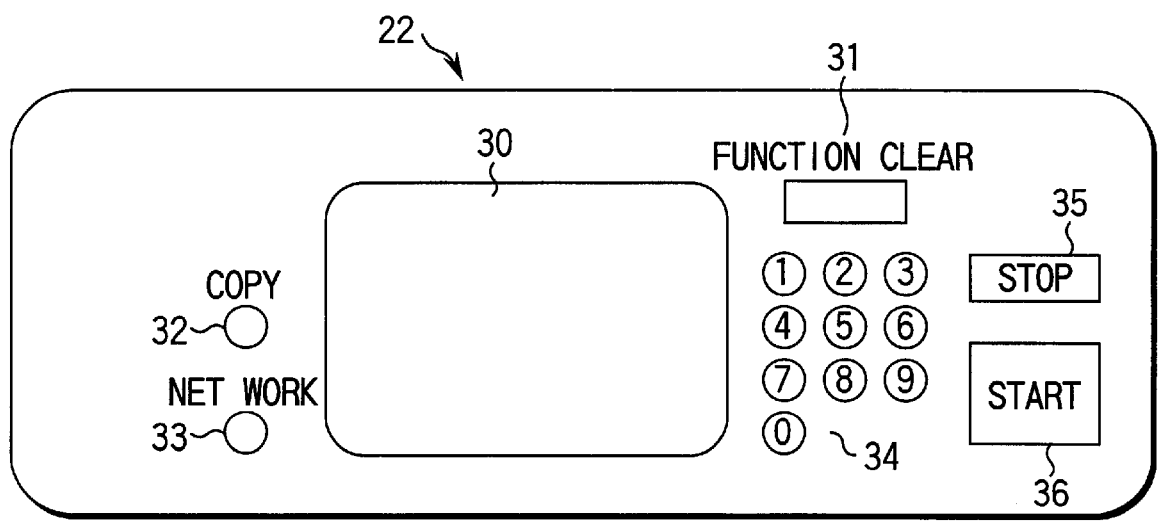
FIG. 3 shows a structure of a control panel unit.

FIG. 3 shows a structure of the control panel unit 22 serving as an input/output interface with the user of the image forming apparatus 10.

The control panel unit 22 is provided with an LCD touch panel 30 comprising a liquid-crystal display (LCD) for displaying various information and a touch panel serving as input means.

A message to the user is displayed on the LCD touch panel 30, and an input by the user is effected through the LCD touch panel 30 and hard keys 31 to 36.

The LCD touch panel 30 is provided with two display functions, that is, a copying-related display function used to effect display relating to a copying function and to effect various settings, and a network-related display function used to display and set various states of the network. These functions are switched by function switch keys 32 and 33.

A clear key 31 is used to clear input data, set values, etc.

The copying function switch key 32 switches display to the copying function, when the network function is being displayed.

The network function switch key 33 switches display to the network function, when the copying function is being displayed.

Ten-keys 34 are used to input numerals.

The stop key 35 is used to interrupt operations, etc.

The start key 36 is used to start operations.

Connection between the image forming apparatus and external apparatus will now be described.

FIG. 4 shows an example of the image forming apparatus 10 connected to an external apparatus (an image input/output controller in this example).

The external controller 15 is connected to the external controller interface unit 24 provided in the image forming apparatus 10 over a cable 28 comprising a control interface and an image data interface. A client 26 comprising a personal computer, etc. is connected to the external controller 15 over a similar cable 28.

With this connection, image data read by the scanner unit 11 of image forming apparatus 10 can be read in the external controller 15, or image data sent from the external controller 15 can be printed by the printer unit 12.

The external controller 15 serving as the external apparatus can perform an input/output control for the network function of the LCD touch panel 30 of the image forming apparatus 10 using the control interfaces.

In addition, the external controller may be connected to a plurality of clients 26 to perform input/output of image data, etc.

An operation of a first embodiment of the image forming apparatus according to the present invention with the above structure will now be described with reference to FIG. 4.

(1) A user A stands in front of the image forming apparatus 10, sets originals on the ADF 1, and depresses the start key 36 (this effects issuance of a scanner job).

(2) When the scanner job has been issued, the central control unit 21 effects issuance of a print job on the print control order management table 21a.

FIG. 5 shows an example of the structure of the print control order management table 21a for managing the print control order in the present invention. The print control is successively carried out from above on the table shown in FIG. 5. As is shown in FIG. 5, a first item on the print control order table 21a is "original data read from ADF."

(3) Assume that print data has been sent from the client 26 to the image forming apparatus 10 via the external controller 15.

(4) Since the central control unit 21 issued the first print job on the print control order management table 21a, it issues as a second print job the print request from the client 26. In other words, the print job from the client 26, which has come later, can be stopped.

(5) The central control unit 21 does not operate the printer unit 12 until the original reading operation by the ADF 1 is finished.

(6) The moment the original reading operation by the ADF 1 is finished, the central control unit 21 executes printing by the printer unit 12 on the basis of the read original data.

(7) After completing printing of all original data read by the ADF 1, the central control unit 21 starts the print job sent from the client 26 during the original reading by the ADF 1.

As has been described above, according to the first embodiment, even if the print job (print request) is sent from the personal computer, etc. while the original is being input by the ADF, the original data input by the ADF is first printed out. Therefore, a sense of unexpectedness is not caused to the user who is inputting originals through the ADF in front of the image forming apparatus.

In the above example, the original reading means is the ADF. Where manually placed originals are read, the process is performed, with the "scanning operation" defined such that it ends when the completion of reading of all originals is indicated by the user. Thereby, even if print data is sent from the personal computer, etc. between a scanning operation and another scanning operation, the print data cannot be printed.

An operation of a second embodiment of the image forming apparatus according to the present invention with the above structure will now be described with reference to a timing chart of FIG. 6.

(1) When a scanner job (1) is started, the central control unit 21 registers a print job (1) on the print control order management table 21a.

(2) Upon starting the scanner job (1), the central control unit 21 executes, in a sequential operation, the print job (1) registered on the print control order management table 21a.

(3) When the scanner job (1) is finished, the central control unit 21 can start a scanner job (2) since the scanner unit 11 is released from operation.

(4) Upon starting the scanner job (2), the central control unit 21 registers a print job (2) on the print control order management table 21a (assume that at this time the print job (1) is still being executed, as shown in FIG. 6).

(5) When the print job (1) is finished, the central control unit 21 starts the print job (2) (time point A) prior to the end of the scanner job (2) even if the scanner job (2) is still being executed, because the print job (2) was registered at the time of starting the scanner job (2).

As has been described above, according to the second embodiment, it is possible to avoid such a situation that even though the printer unit is not used and there is a print job which is yet to be executed, the printer unit cannot be used due to a wait for the issuance of the print job. Accordingly, the total time for completion of all jobs can be reduced.

What is claimed is:

1. An image forming apparatus connected to a personal computer via a communication line, comprising:

feed means for successively feeding originals;

instruction means for instructing start of a scanner job after the originals have been set on the feed means;

a scanner for reading the originals fed by the feed means, when the instruction means has instructed the start of the scanner job;

reception means for receiving image data transmitted from said personal computer;

memory means for storing image data read by the scanner and the image data received by the reception means;

a printer for forming images of the image data stored in the memory means;

first control means for issuing, when the instruction means has instructed the start of the scanner job, a print job of the image data read by the scanner job;

second control means for issuing, when the reception means has received the image data, a print job of the image data received by the reception means;

a table for registering print jobs, issued by the first and second control means, in a print job order, wherein the print job order is the order of issuance of print jobs by the first and second control means; and third control means for reading from the memory means the image data corresponding to an earlier registered print job registered on the table, and controlling an image forming operation in the printer according to the print job order.

2. An image forming apparatus according to claim 1, Wherein when said scanner job is finished, the scanner starts another scanner job in accordance with a subsequent instruction of the instruction means, irrespective of the image forming operation of the printer by the third control means.

* * * * *